(12) United States Patent
Kim et al.

(10) Patent No.: US 10,800,882 B2
(45) Date of Patent: Oct. 13, 2020

(54) POLYIMIDE-BASED BLOCK COPOLYMERS AND POLYIMIDE-BASED FILM COMPRISING THE SAME

(71) Applicant: LG CHEM, LTD., Seoul (KR)

(72) Inventors: Sang Gon Kim, Daejeon (KR); Sung Yeol Choi, Daejeon (KR); Duk Hun Jang, Daejeon (KR); Hyung Sam Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 210 days.

(21) Appl. No.: 15/773,829

(22) PCT Filed: Sep. 8, 2017

(86) PCT No.: PCT/KR2017/009901
§ 371 (c)(1),
(2) Date: May 4, 2018

(87) PCT Pub. No.: WO2018/052221
PCT Pub. Date: Mar. 22, 2018

(65) Prior Publication Data
US 2018/0355110 A1  Dec. 13, 2018

(30) Foreign Application Priority Data
Sep. 13, 2016 (KR) .................. 10-2016-0118301

(51) Int. Cl.
*C08G 73/14* (2006.01)
*C08J 5/18* (2006.01)
(Continued)

(52) U.S. Cl.
CPC ............. *C08G 73/14* (2013.01); *C08G 18/64* (2013.01); *C08G 73/10* (2013.01);
(Continued)

(58) Field of Classification Search
None
See application file for complete search history.

(56) References Cited

U.S. PATENT DOCUMENTS 5,118,778 A   6/1992  Lambla et al.
5,177,181 A * 1/1993  Rosenfeld ............. C07C 229/60
                                                    528/353
(Continued)

FOREIGN PATENT DOCUMENTS

CN   1057273 A   12/1991
CN   1449424 A   10/2003
(Continued)

OTHER PUBLICATIONS

Liu et al., "Synthesis of soluble and autophotosensitive hyperbranched polyimides with good optical properties and thermal properties", Polymer Journal, 2013, vol. 45, pp. 318-325.
(Continued)

*Primary Examiner* — Rachel Kahn
(74) *Attorney, Agent, or Firm* — Rothwell, Figg, Ernst & Manbeck, P.C.

(57) ABSTRACT

The present disclosure relates to a polyimide-based block copolymer and a polyimide-based film including the same. The polyimide-based block copolymer according to the present disclosure makes it possible to provide a polyimide-based film exhibiting excellent mechanical properties while having a high molecular weight, and being colorless and transparent.

10 Claims, 1 Drawing Sheet

(51) Int. Cl.
*C08G 73/10* (2006.01)
*C08L 79/08* (2006.01)
*C08G 18/64* (2006.01)

(52) U.S. Cl.
CPC ............ *C08G 73/1042* (2013.01); *C08J 5/18* (2013.01); *C08L 79/08* (2013.01); *C08J 2379/08* (2013.01)

(56) References Cited

U.S. PATENT DOCUMENTS

| | | | |
|---|---|---|---|
| 5,243,024 | A | 9/1993 | Bockrath et al. |
| 9,365,694 | B2 | 6/2016 | Cho et al. |
| 9,434,832 | B1 | 9/2016 | Meador |
| 2004/0006174 | A1 | 1/2004 | Tödter König et al. |
| 2009/0176961 | A1 | 7/2009 | Kikuchi et al. |
| 2009/0301753 | A1 | 12/2009 | Kikuchi et al. |
| 2010/0151333 | A1 | 6/2010 | Nakamori et al. |
| 2010/0228002 | A1 | 9/2010 | Sohn et al. |
| 2012/0296050 | A1 | 11/2012 | Cho et al. |
| 2012/0329958 | A1 | 12/2012 | Freeman et al. |
| 2014/0243482 | A1* | 8/2014 | Park .............. C08G 73/14 525/450 |
| 2016/0039977 | A1 | 2/2016 | Cho et al. |

FOREIGN PATENT DOCUMENTS

| | | |
|---|---|---|
| CN | 101228303 A | 7/2008 |
| CN | 101481582 A | 7/2009 |
| CN | 101597462 A | 12/2009 |
| CN | 102643601 A | 8/2012 |
| EP | 0637613 A1 | 2/1995 |
| JP | H04-296327 A | 10/1992 |
| JP | 2000-302967 A | 10/2000 |
| KR | 10-0688912 B1 | 2/2007 |
| KR | 10-2013-0029129 A | 3/2013 |
| KR | 10-2013-0078307 A | 7/2013 |
| KR | 10-2014-0016199 A | 2/2014 |
| KR | 10-1524195 B1 | 5/2015 |
| KR | 10-2016-0059097 A | 5/2016 |
| KR | 20160059097 A * | 5/2016 |
| KR | 10-2017-0136319 A | 12/2017 |
| KR | 10-2018-0001249 A | 1/2018 |
| WO | 2016-108675 A | 7/2016 |

OTHER PUBLICATIONS

Search Report and Written Opinion issued for PCT/KR2017/009901 dated Jan. 11, 2018 (10 pages).

* cited by examiner

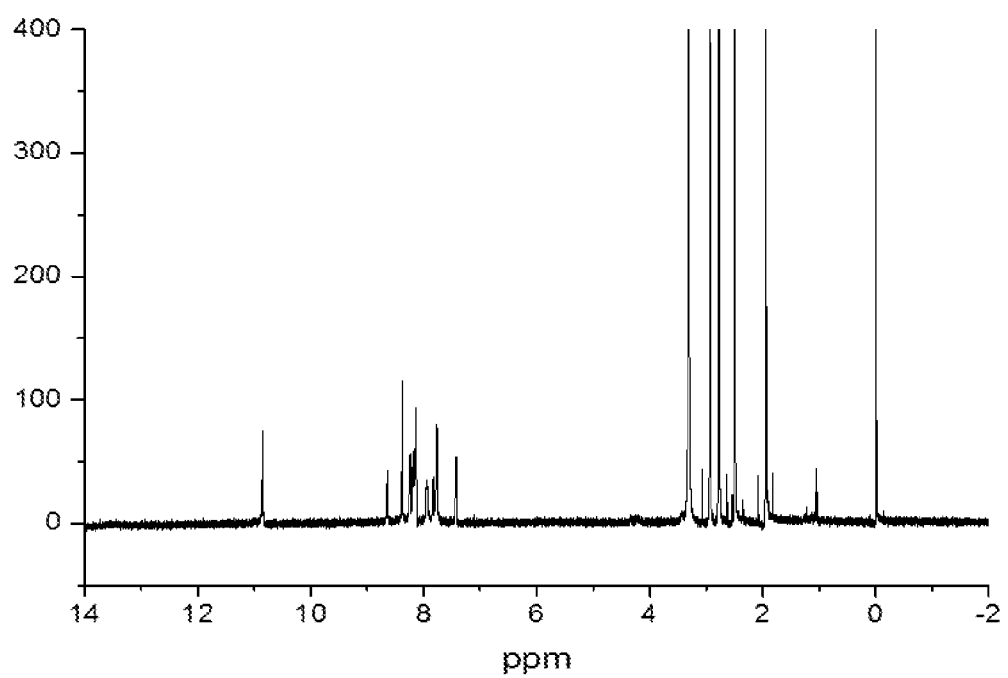

POLYIMIDE-BASED BLOCK COPOLYMERS AND POLYIMIDE-BASED FILM COMPRISING THE SAME

CROSS-REFERENCE TO RELATED APPLICATION

This application is a 35 U.S.C. 371 National Phase Entry Application from PCT/KR2017/009901, filed Sep. 8, 2017, which claims the benefit of Korean Patent Application No. 10-2016-0118301 filed on Sep. 13, 2016 with the Korean Intellectual Property Office, the disclosures of which are incorporated herein by reference in their entirety.

TECHNICAL FIELD

The present disclosure relates to a polyimide-based block copolymer and a polyimide-based film including the same.

BACKGROUND OF ART

An aromatic polyimide resin is a polymer having a mostly amorphous structure, and exhibits excellent heat resistance, chemical resistance, electrical properties, and dimensional stability due to its rigid chain structure. The polyimide resin is widely used as an electric/electronic material.

However, the polyimide resin has many limitations in use, because it is dark brown due to the formation of a CTC (charge transfer complex) of π electrons present in the imide chain.

A method of restricting the movement of the π electrons by introducing a strong electron attracting group such as a trifluoromethyl (—$CF_3$) group, a method of reducing the formation of the CTC by introducing a sulfone (—$SO_2$—) group, an ether (—O—) group, or the like into the main chain to make a bent structure, and a method of inhibiting the formation of the resonance structure of the π electrons by introducing an aliphatic cyclic compound, have been proposed.

However, it is difficult for the polyimide resin according to the proposals to exhibit sufficient heat resistance due to the bending structure or the aliphatic cyclic compound, and a film prepared using the same still has limitations such as poor mechanical properties.

DETAILED DESCRIPTION OF THE INVENTION

Technical Problem

The present disclosure is to provide a polyimide-based block copolymer exhibiting excellent mechanical properties while being colorless and transparent.

The present disclosure is also to provide a polyimide-based film including the same.

Technical Solution

The present disclosure provides a polyimide-based block copolymer including a first repeating unit represented by Chemical Formula 1, and a second repeating unit represented by Chemical Formula 2:

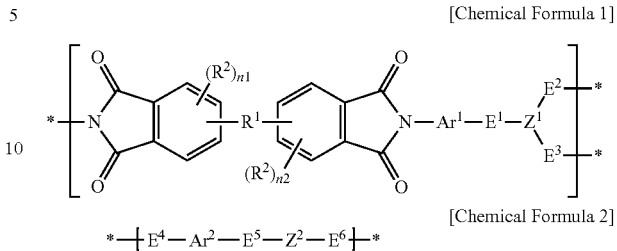

[Chemical Formula 1]

[Chemical Formula 2]

wherein, in Chemical Formula 1 and 2, each $R^1$ is the same as or different from each other in each repeating unit, and each is independently a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, —C(=O)NH—, or a C6 to C30 aromatic organic group;

each $R^2$ is independently —H, —F, —Cl, —Br, —I, —CF$_3$, —CCl$_3$, —CBr$_3$, —Cl$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group;

n1 and n2 are independently 0 to 3;

$Ar^1$ and $Ar^2$ are the same as or different from each other in each repeating unit, and each is independently a C6 to C30 aromatic organic group, at least one of $Ar^1$ and $Ar^2$ includes a C6 to C30 aromatic organic group substituted with —OH, —COOH, —CN, acrylate, or methacrylate, and the aromatic organic group exists alone, or two or more aromatic organic groups are bonded to each other to form a condensed ring, or two or more aromatic organic groups are linked by a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—;

$E^1$ to $E^6$ are independently a single bond, —NH—, or —C(=O)—;

each $Z^1$ is the same as or different from each other in each repeating unit, and each is independently a trivalent linking group derived from at least one compound selected from the group consisting of triacyl halide, triamine, and tricarboxylic acid; and each $Z^2$ is the same as or different from each other in each repeating unit, and each is independently a divalent linking group derived from at least one compound selected from the group consisting of diacyl halide, diamine, and dicarboxylic acid.

The present disclosure also provides a polyimide-based film including the polyimide-based block copolymer.

Hereinafter, the polyimide-based block copolymer and the polyimide-based film including the same according to the exemplary embodiments of the present disclosure will be described in more detail.

Prior to that, it is to be understood that terms used herein are merely to refer to specific embodiments, and are not intended to restrict the present disclosure unless it is explicitly expressed.

Singular expressions of the present disclosure may include plural expressions unless it is differently expressed contextually.

The terms "include", "comprise", and the like of the present disclosure are used to specify certain features, regions, integers, steps, operations, elements, and/or components, and these do not exclude the existence or the addition of other certain features, regions, integers, steps, operations, elements, and/or components.

Also, the terms including ordinal numbers such as "first" and "second" are used to distinguish one component from another, and the components are not limited by the ordinal number. For example, within the scope of the present invention, the first component may also be referred to as a second component, and similarly, the second component may be referred to as a first component.

Further, the symbol "*" in chemical formulas of the present disclosure represents a part at which a group or repeating unit is connected to another group or repeating unit.

I. The Polyimide-Based Block Copolymer

According to an exemplary embodiment of the present disclosure, a polyimide-based block copolymer including a first repeating unit represented by Chemical Formula 1 and a second repeating unit represented by Chemical Formula 2 is provided.

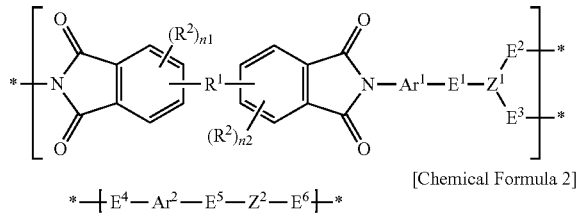

[Chemical Formula 1]

[Chemical Formula 2]

In Chemical Formulae 1 and 2, each $R^1$ is the same as or different from each other in each repeating unit, and each is independently a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, —C(=O)NH—, or a C6 to C30 aromatic organic group;

each $R^2$ is independently —H, —F, —Cl, —Br, —I, —CF$_3$, —CCl$_3$, —CBr$_3$, —Cl$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group;

n1 and n2 are independently 0 to 3;

$Ar^1$ and $Ar^2$ are the same as or different from each other in each repeating unit, and each is independently a C6 to C30 aromatic organic group, at least one of $Ar^1$ and $Ar^2$ includes a C6 to C30 aromatic organic group substituted with —OH, —COOH, —CN, acrylate, or methacrylate, and the aromatic organic group exists alone, or two or more aromatic organic groups are bonded to each other to form a condensed ring, or two or more aromatic organic groups are linked by a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—;

$E^1$ to $E^6$ are independently a single bond, —NH—, or —C(=O)—;

each $Z^1$ is the same as or different from each other in each repeating unit, and each is independently a trivalent linking group derived from at least one compound selected from the group consisting of triacyl halide, triamine, and tricarboxylic acid; and each $Z^2$ is the same as or different from each other in each repeating unit, and each is independently a divalent linking group derived from at least one compound selected from the group consisting of diacyl halide, diamine, and dicarboxylic acid.

As a result of further studies by the present inventors, it was confirmed that the polyimide-based block copolymer block copolymerized with a brancher having three reactive substituents in a linear polyimide chain and a crosslinkable functional group has a high molecular weight, is colorless and transparent, and has excellent mechanical properties.

In the polyimide-based block copolymer, the brancher may impart a stable network structure to the copolymer. Furthermore, the crosslinkable functional group may induce intramolecular crosslinking of the copolymer to strengthen the network structure, while allowing the copolymer to have a higher molecular weight. Such a rigid and stable network structure may allow the polyimide-based block copolymer to exhibit improved mechanical properties while having a high molecular weight and being colorless and transparent.

The polyimide-based block copolymer of the present disclosure includes the first repeating unit represented by Chemical Formula 1 and the second repeating unit represented by Chemical Formula 2.

[Chemical Formula 1]

[Chemical Formula 2]

In the first repeating unit of Chemical Formula 1, each $R^1$ is the same as or different from each other in each repeating unit, and each is independently a single bond, —O—, —S—, —C(=O)—, —CH(OH)—, —S(=O)$_2$, —Si (CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, —C(=O) NH—, or a C6 to C30 aromatic organic group.

Herein, the single bond means a case that $R^1$ in Chemical Formula 1 is a chemical bond which simply links the groups on both sides.

Further, the C6 to C30 aromatic organic group exists alone, or two or more aromatic organic groups are bonded to each other to form a condensed ring, or two or more aromatic organic groups are linked by a single bond, —O—, —S—, —C(=O)—, —CH(OH)—, —S(=O)$_2$, —Si (CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

In the first repeating unit of Chemical Formula 1, each $R^2$ is independently —H, —F, —Cl, —Br, —I, —CF$_3$, —CCl$_3$, —CBr$_3$, —Cl$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group.

In the first repeating unit of Chemical Formula 1, n1 and n2 are independently an integer of 0 to 3.

In the first repeating unit of Chemical Formula 1 and the second repeating unit of Chemical Formula 2, $Ar^1$ and $Ar^2$ are the same as or different from each other in each repeating unit, and each independently includes a C6 to C30 aromatic organic group.

In particular, at least one of $Ar^1$ and $Ar^2$ includes a C6 to C30 aromatic organic group substituted with a crosslinkable functional group. $Ar^1$ and $Ar^2$ may independently include a C6 to C30 aromatic organic group substituted with a crosslinkable functional group.

Preferably, the crosslinkable functional group may be with —OH, —COOH, —CN, acrylate, or methacrylate.

Further, in $Ar^1$ and $Ar^2$, the aromatic organic group exists alone, or two or more aromatic organic groups are bonded to each other to form a condensed ring, or two or more aromatic organic groups are linked by a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

Preferably, the $Ar^1$ and $Ar^2$ may independently be a group represented by Chemical Formula Ar(A) or Ar(B).

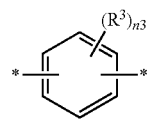

[Chemical Formula Ar(A)]

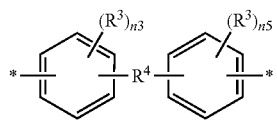

[Chemical Formula Ar(B)]

In Chemical Formulae Ar(A) and Ar(B), each $R^3$ is independently —OH, —COOH, —CN, acrylate, or methacrylate;

n3 to n5 are independently 0 to 4, and at least one of n3 to n5 included in $Ar^1$ and $Ar^2$ is more than 1; and each $R^4$ is independently a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

In the first repeating unit of Chemical Formula 1 and the second repeating unit of Chemical Formula 2, $E^1$, $E^2$, $E^3$, $E^4$, $E^5$, and $E^6$ are independently a single bond, —NH—, or —C(=O)—. Herein, the single bond means a case that $E^1$ to $E^6$ are a chemical bond which simply links the groups on both sides.

In the first repeating unit of Chemical Formula 1, $Z^1$ is a brancher having three reactive substituents, each is the same as or different from each other in each repeating unit, and each is independently a trivalent linking group derived from at least one compound selected from the group consisting of triacyl halide, triamine, and tricarboxylic acid.

Specifically, the $Z^1$ may be a trivalent linking group derived from at least one compound selected from the group consisting of benzene-1,3,5-tricarbonyl trichloride, benzene-1,3,5-tricarboxylic acid, benzene-1,3,5-triamine, benzene-1,2,4-triamine, cyclohexane-1,3,5-triamine, cyclohexane-1,2,4-triamine, and pyrimidine-2,4,6-triamine.

Preferably, the $Z^1$ may be selected from the group represented by Chemical Formula Z1.

[Chemical Formula Z1]

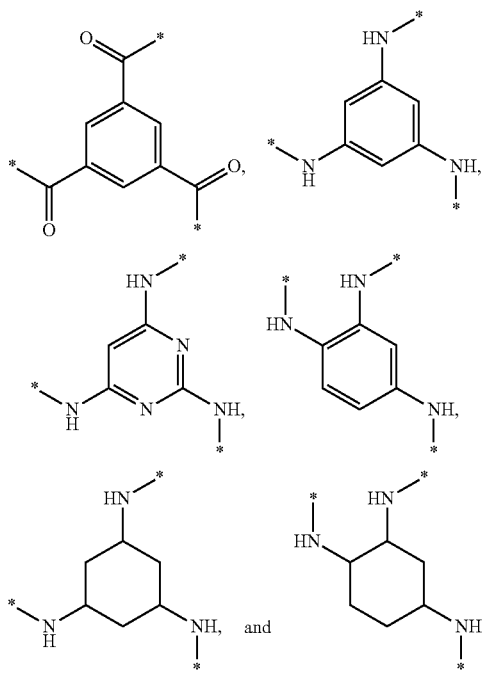

In the second repeating unit of Chemical Formula 2, each $Z^2$ is the same as or different from each other in each repeating unit, and each is independently a divalent linking group derived from at least one compound selected from the group consisting of diacyl halide, diamine, and dicarboxylic acid.

Specifically, the $Z^2$ may be a divalent linking group derived from at least one compound selected from the group consisting of isophthaloyl dichloride, terephthaloyl chloride, isophthalic acid, terephthalic acid, benzene-1,3-diamine, benzene-1,4-diamine, pyrimidine-2,5-diamine, pyrimidine-2,4-diamine, cyclohexane-1,3-diamine, and cyclohexane-1,4-diamine.

Preferably, the $Z^2$ may be selected from the group represented by Chemical Formula Z2.

[Chemical Formula Z2]

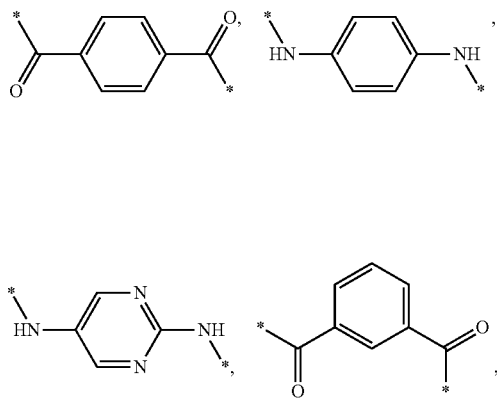

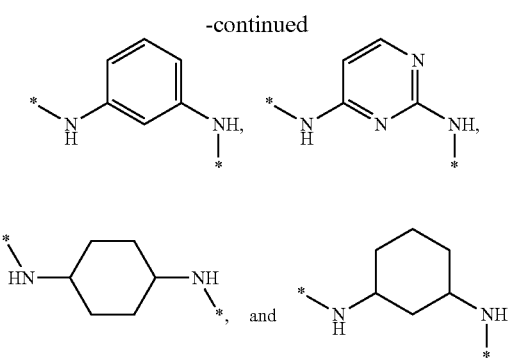

Preferably, the first repeating unit includes a repeating unit represented by Chemical Formula 1A, and the second repeating unit includes a repeating unit represented by Chemical Formula 2A in the polyimide-based block copolymer.

In Chemical Formulae 1A and 2A, $Ar^1$ and $Ar^2$ are the same as or different from each other in each repeating unit, and each is independently a C6 to C30 aromatic organic group, and at least one of $Ar^1$ and $Ar^2$ includes a C6 to C30 aromatic organic group substituted with —OH, —COOH, —CN, acrylate, or methacrylate.

The aromatic organic group exists alone, or two or more aromatic organic groups are bonded to each other to form a condensed ring, or two or more aromatic organic groups are linked by a single bond, —O—, —S—, —C(=O)—, —CH(OH)—, —S(=O)$_2$, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

More preferably, the first repeating unit includes a repeating unit represented by Chemical Formula 1B, and the second repeating unit includes a repeating unit represented by Chemical Formula 2B in the polyimide-based block copolymer.

[Chemical Formula 1B]

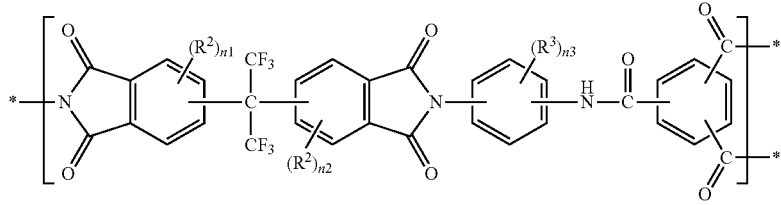

[Chemical Formula 2B]

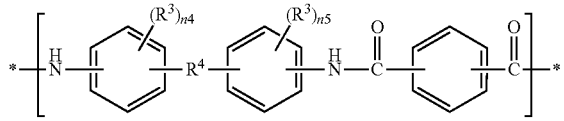

[Chemical Formula 1A]

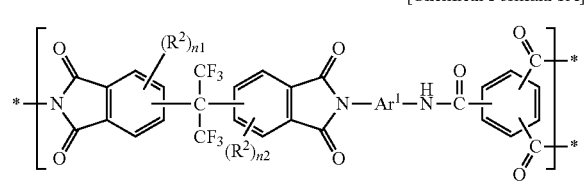

[Chemical Formula 2A]

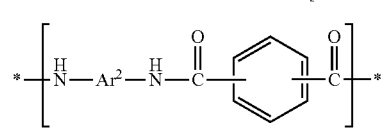

In Chemical Formulae 1A and 2A, each $R^2$ is independently —H, —F, —Cl, —Br, —I, —CF$_3$, —CCl$_3$, —CBr$_3$, —Cl$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group.

In Chemical Formulae 1A and 2A, n1 and n2 are independently 0 to 3.

In Chemical Formulae 1B and 2B, each $R^2$ is independently —H, —F, —Cl, —Br, —I, —CF$_3$, —CCl$_{13}$, —CBr$_3$, —Cl$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group.

In Chemical Formulae 1B and 2B, n1 and n2 are independently 0 to 3.

In Chemical Formulae 1B and 2B, each $R^3$ is independently —OH, —COOH, —CN, acrylate, or methacrylate, n3 to n5 are independently 0 to 4, and at least one of n3 to n5 is more than 1.

In Chemical Formulae 1B and 2B, each $R^4$ is independently a single bond, —O—, —S—, —C(=O)—, —CH(OH)—, —S(=O)$_2$, —Si(CH$_3$)$_2$, —(CH$_2$)$_p$— (wherein 1≤p≤10), —(CF$_2$)$_q$— (wherein 1≤q≤10), —C(CH$_3$)$_2$, —C(CF$_3$)$_2$—, or —C(=O)NH—.

In the polyimide-based block copolymer, a weight ratio of the first repeating unit to the second repeating unit may be 1:1 to 3:1, preferably 1.4:1 to 2.5:1.

As described above, the $Z^1$ introduced into the first repeating unit is a brancher that imparts a network structure to the copolymer. By the block copolymerization of the repeating units containing the brancher, a network having a stable structure may be formed in the copolymer. Therefore, when the weight ratio of the first repeating unit is too low, the network structure is not sufficiently formed in the copolymer, thereby the effect of improving the physical properties may be insignificant. However, if the weight ratio of the first repeating unit is too high, gelation may occur during the polymerization.

The polyimide-based block copolymer may have a higher molecular weight than a polyimide resin having a general linear structure, due to a strong and stable network structure as well as intramolecular crosslinking.

Specifically, the polyimide-based block copolymer may have a weight average molecular weight of 100,000 to 5,000,000 g/mol. Preferably, the polyimide-based block copolymer may have a weight average molecular weight of more than 100,000 g/mol, or more than 200,000 g/mol, or more than 250,000 g/mol, and less than 5,000,000 g/mol, or less than 1,000,000 g/mol, or less than 750,000 g/mol, or less than 500,000 g/mol.

In addition, the polyimide-based block copolymer may be prepared by the method including the steps of mixing compounds forming the first repeating unit in an appropriate solvent to initiate the reaction; adding compounds forming the second repeating unit to the reaction mixture and reacting; and adding a compound such as acetic anhydride or pyridine to the reaction mixture to induce a chemical imidization reaction.

The polyimide block copolymer may be prepared by low-temperature solution polymerization, interfacial polymerization, melt polymerization, solid phase polymerization, and the like.

II. The Polyimide-Based Film

According to another exemplary embodiment of the present disclosure, a polyimide-based film including the polyimide-based block copolymer is provided.

As described above, as a result of further studies by the present inventors, it was confirmed that the polyimide-based block copolymer block copolymerized with a brancher having three reactive substituents in a linear polyimide chain and a crosslinkable functional group has a high molecular weight, is colorless and transparent, and has excellent mechanical properties.

Therefore, the polyimide-based film containing the polyimide-based block copolymer may be used as a material for various molded articles requiring high mechanical properties together with colorless transparency. For example, the polyimide-based film containing the polyimide-based block copolymer may be applied as a substrate for a display, a protective film for a display, a touch panel, or the like.

The polyimide-based film may be prepared by a conventional method such as a dry method or a wet method using the polyimide-based block copolymer. For example, the polyimide-based film may be obtained by coating a solution containing the copolymer on an arbitrary support to form a film, and drying the film by evaporating the solvent from the film. If necessary, stretching and heat treatment of the polyimide-based film may be performed.

The polyimide-based film may exhibit excellent mechanical properties while being colorless and transparent, since it is prepared using the polyimide-based block copolymer.

Specifically, the polyimide-based film may exhibit pencil hardness of at least 1H, as measured in accordance with ASTM D3363.

Advantageous Effects

The polyimide-based block copolymer according to the present disclosure makes it possible to provide a polyimide-based film exhibiting excellent mechanical properties while having a high molecular weight, and being colorless and transparent.

BRIEF DESCRIPTION OF THE DRAWINGS

FIG. 1 is an NMR spectrum of the polyimide-based copolymer obtained in Example 1.

DETAILED DESCRIPTION OF THE EMBODIMENTS

Hereinafter, preferred examples are provided for better understanding. However, these examples are for illustrative purposes only, and the invention is not intended to be limited by these examples.

Example 1

4.6101 g (1.01 eq., 0.0303 mol) of 3,5-diaminobenzoic acid, 13.060 g (0.9825 eq., 0.0294 mol) of 4,4'-(hexafluoroisopropylidene)diphthalic anhydride, 0.040 g (0.005 eq., 0.000151 mol) of benzene-1,3,5-tricarbonyl trichloride, and 127 ml of dimethylacetamide were placed to a 250 mL round flask equipped with a Dean-Stark apparatus and a condenser, and the reaction was initiated at room temperature. The reaction mixture was stirred with ice water at 0° C. for 4 hours under a nitrogen atmosphere.

After 4 hours, the reaction product was taken out and raised to room temperature, 9.5111 g (0.99 eq., 0.0297 mol) of 2,2'-bis(trifluoromethyl)benzidine, 6.1515 g (1.01 eq., 0.0303 mol) of isophthaloyl dichloride, and 112 ml of dimethylacetamide were added thereto, and the reaction was initiated at room temperature under a nitrogen atmosphere.

After a polyamic acid polymer was formed by the reaction for 4 hours, 14 mL (10 eq., 0.15 mol) of acetic anhydride and 12 mL (10 eq., 0.15 mol) of pyridine were added to the reaction mixture, and the mixture was stirred in an oil bath at 40° C. for 15 hours to carry out the chemical imidization reaction.

After completion of the reaction, the reaction product was precipitated in water and ethanol to obtain a polyimide-based block copolymer having the following repeating units (weight average molecular weight of about 490,000 g/mol).

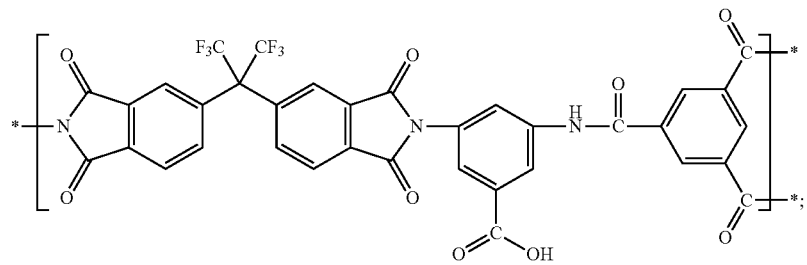

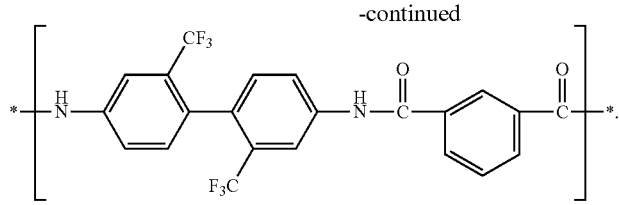

$^1$H NMR (CDCl$_3$, TMS as standard material) δ (ppm): 10.854(s), 8.644(s), 8.383(s), 8.256(m), 8.162(d), 8.044(s), 8.017(d), 7.851(d), 7.816(m), 7.7(d), 7.430(d)

Example 2

A polyimide-based copolymer (weight average molecular weight of about 480,000 g/mol) was obtained in the same manner as in Example 1, except that the benzene-1,3,5-tricarbonyl trichloride was used in an amount of 0.0266 g (0.01 eq., 0.0001 mol).

$^1$H NMR (CDCl$_3$, TMS as standard material) δ (ppm): 10.854(s), 8.644(s), 8.383(s), 8.256(m), 8.162(d), 8.044(s), 8.017(d), 7.851(d), 7.816(m), 7.7(d), 7.430(d)

Comparative Example 1

A polyimide-based copolymer (weight average molecular weight of about 479,000 g/mol) was obtained in the same manner as in Example 1, except that the benzene-1,3,5-tricarbonyl trichloride was not used in the formation of the copolymer.

Comparative Example 2

4.80 g (1 eq., 0.015 mol) of 2,2'-bis(trifluoromethyl)benzidine, 6.56 g (0.985 eq., 0.0148 mol) of 4,4'-(hexafluoroisopropylidene)diphthalic anhydride, 1.5227 g (0.5 eq., 0.0075 mol) of isophthaloyl dichloride, 0.039 g (0.01 eq., 0.00015 mol) of benzene-1,3,5-tricarbonyl trichloride, and 70 ml of dimethylacetamide were placed to a 250 mL round flask equipped with a Dean-Stark apparatus and a condenser, and the reaction was initiated at room temperature.

14 mL (10 eq., 0.15 mol) of acetic anhydride and 12 mL (10 eq., 0.15 mol) of pyridine were added to the reaction mixture, and the mixture was stirred in an oil bath at 40° C. for 15 hours to carry out the chemical imidization reaction.

After completion of the reaction, the reaction product was precipitated in water and ethanol to obtain a polyimide-based random copolymer having the following repeating units (weight average molecular weight of about 160,000 g/mol).

$^1$H NMR (CDCl$_3$, TMS as standard material) δ (ppm): 10.854(s), 8.644(s), 8.256(m), 8.162(d), 8.044(s), 8.017(d), 7.851(d), 7.816(m), 7.7(d), 7.430(d)

Preparation Examples 1 to 4

A film was produced using the polyimide-based copolymer obtained in Example 1 (Preparation Example 1). A film was produced using the polyimide-based copolymer obtained in Example 2 (Preparation Example 2). A film was produced using the polyimide-based copolymer obtained in Comparative Example 1 (Preparation Example 3). A film was produced using the polyimide-based copolymer obtained in Comparative Example 2 (Preparation Example 4).

Specifically, the polyimide-based copolymer was dissolved in N,N-dimethylacetamide to prepare a polymer solution of about 25% (w/V). The polymer solution was poured on a glass plate, the thickness of the polymer solution was uniformly controlled using a film applicator, and then dried in a vacuum oven at 100° C. for more than 12 hours to produce a polyimide-based film having a thickness of 20 to 30 μm.

Experimental Examples (1) Yellow index (Y.I.): The yellow index of the polyimide-based films according to the Preparation Examples 1 to 4 was measured in accordance with ASTM E313 using a COH-400 Spectrophotometer (NIPPON DENSHOKU INDUSTRIES).

(2) Pencil hardness: The pencil hardness of the polyimide-based films according to Preparation Examples 1 to 4 was measured in accordance with ASTM D3363 using a Pencil Hardness Tester. Specifically, varying hardness values of pencils were fixed to the tester and scratched on the film, and the degree of occurrence of a scratch on the film was observed with the naked eye or with a microscope. When more than 70% of the total number of scratches were not observed, a value corresponding to the hardness of the pencil was evaluated as the pencil hardness of the film.

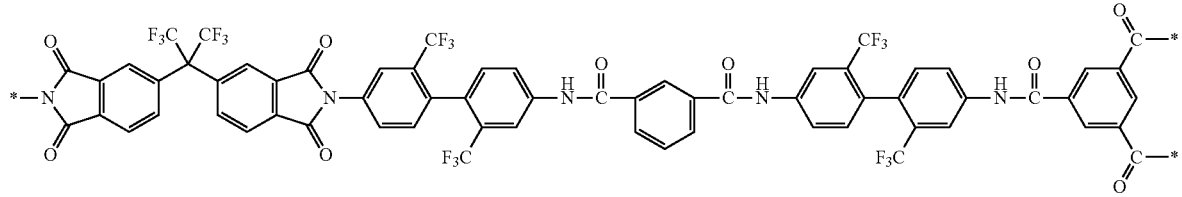 [SMILES: *C(=O)c1cc(C(*)=O)cc(C(=O)Nc2ccc(-c3ccc(NC(=O)c4cccc(C(=O)Nc5ccc(-c6ccc(N7C(=O)c8ccc(C(c9ccc%10c(c9)C(=O)N(*)C%10=O)(C(F)(F)F)C(F)(F)F)cc8C7=O)cc6C(F)(F)F)c(C(F)(F)F)c5)c4)cc3C(F)(F)F)c(C(F)(F)F)c2)c1]

TABLE 1

|  | Preparation Example 1 | Preparation Example 2 | Preparation Example 3 | Preparation Example 4 |
|---|---|---|---|---|
| Yellow index (YI) | 2.05 | 2.01 | 2.2 | 1.7 |
| Pencil hardness | 1H | 1H | B | HB |

Referring to Table 1, it was confirmed that the films according to the Preparation Examples 1 and 2 exhibited a lower yellow index and improved pencil hardness than the film of Preparation Example 3.

In addition, the film of Preparation Example 1 exhibited a somewhat higher yellow index than the film of Preparation Example 4, but it was confirmed to have improved pencil hardness. Since the block copolymer of Example 1 has a well-aligned structure compared with the random copolymer of Comparative Example 2, it is expected that the block copolymer maintains interpolymer-chain hydrogen bonding and cross-linking and exhibits good mechanical properties.

The invention claimed is:

1. A polyimide-based block copolymer comprising
a first repeating unit represented by Chemical Formula 1, and
a second repeating unit represented by Chemical Formula 2:

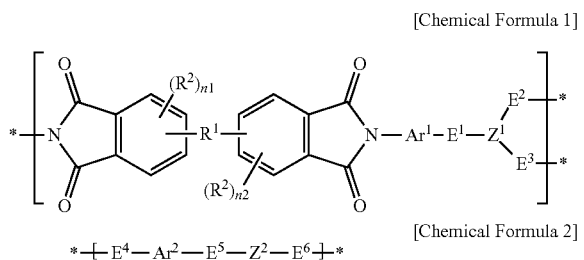

[Chemical Formula 1]

*—[—E⁴—Ar²—E⁵—Z²—E⁶—]—*

[Chemical Formula 2]

wherein, in Chemical Formulae 1 and 2, each $R^1$ is the same as or different from each other in each repeating unit, and each is independently a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, —C(=O)NH—, or a C6 to C30 aromatic organic group;

each $R^2$ is independently —H, —F, —Cl, —Br, —I, —CF$_3$, —CCl$_3$, —CBr$_3$, —CI$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group;

n1 and n2 are independently 0 to 3;

Ar$^1$ and Ar$^2$ are the same as or different from each other in each repeating unit, and each is independently a C6 to C30 aromatic organic group, at least one of Ar$^1$ and Ar$^2$ comprises a C6 to C30 aromatic organic group substituted with —COOH, acrylate, or methacrylate, and the aromatic organic group exists alone, or two or more aromatic organic groups are bonded to each other to form a condensed ring, or two or more aromatic organic groups are linked by a single bond, —O—, —S—, —C(=O)—, —CH(OH)—, —S(=O)$_2$—, —Si(CH$_3$)$_2$—, —(CH$_2$)$_p$—(wherein 1≤p≤10), —(CF$_2$)$_q$— (wherein 1≤q≤10), —C(CH$_3$)$_2$—, —C(CF$_3$)$_2$—, or —C(=O)NH—;

$E^1$ to $E^6$ are independently a single bond, —NH—, or —C(=O)—;

each $Z^1$ is the same as or different from each other in each repeating unit, and each is independently a trivalent linking group derived from at least one compound selected from the group consisting of triacyl halide, triamine, and tricarboxylic acid; and each $Z^2$ is the same as or different from each other in each repeating unit, and each is independently a divalent linking group derived from at least one compound selected from the group consisting of diacyl halide, diamine, and dicarboxylic acid.

2. The polyimide-based block copolymer of claim 1,
wherein Ar$^1$ and Ar$^2$ are independently a group represented by Chemical Formula Ar(A) or Ar(B):

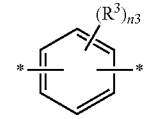

[Chemical Formula Ar(A)]

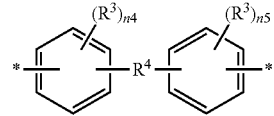

[Chemical Formula Ar(B)]

wherein, in Chemical Formulae Ar(A) and Ar(B), each $R^3$ is independently —COOH, acrylate, or methacrylate;

n3 to n5 are independently 0 to 4, and at least one of n3 to n5 included in Ar$^1$ and Ar$^2$ is more than 1; and each $R^4$ is independently a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

3. The polyimide-based block copolymer of claim 1, wherein $Z^1$ is a trivalent linking group derived from at least one compound selected from the group consisting of benzene-1,3,5-tricarbonyl trichloride, benzene-1,3,5-tricarboxylic acid, benzene-1,3,5-triamine, benzene-1,2,4-triamine, cyclohexane-1,3,5-triamine, cyclohexane-1,2,4-triamine, and pyrimidine-2,4,6-triamine; and $Z^2$ is a divalent linking group derived from at least one compound selected from the group consisting of isophthaloyl dichloride, terephthaloyl chloride, isophthalic acid, terephthalic acid, benzene-1,3-diamine, benzene-1,4-diamine, pyrimidine-2,5-diamine, pyrimidine-2,4-diamine, cyclohexane-1,3-diamine, and cyclohexane-1,4-diamine.

4. The polyimide-based block copolymer of claim 1, wherein $Z^1$ is selected from the group represented by Chemical Formula Z1, and $Z^2$ is selected from the group represented by Chemical Formula Z2:

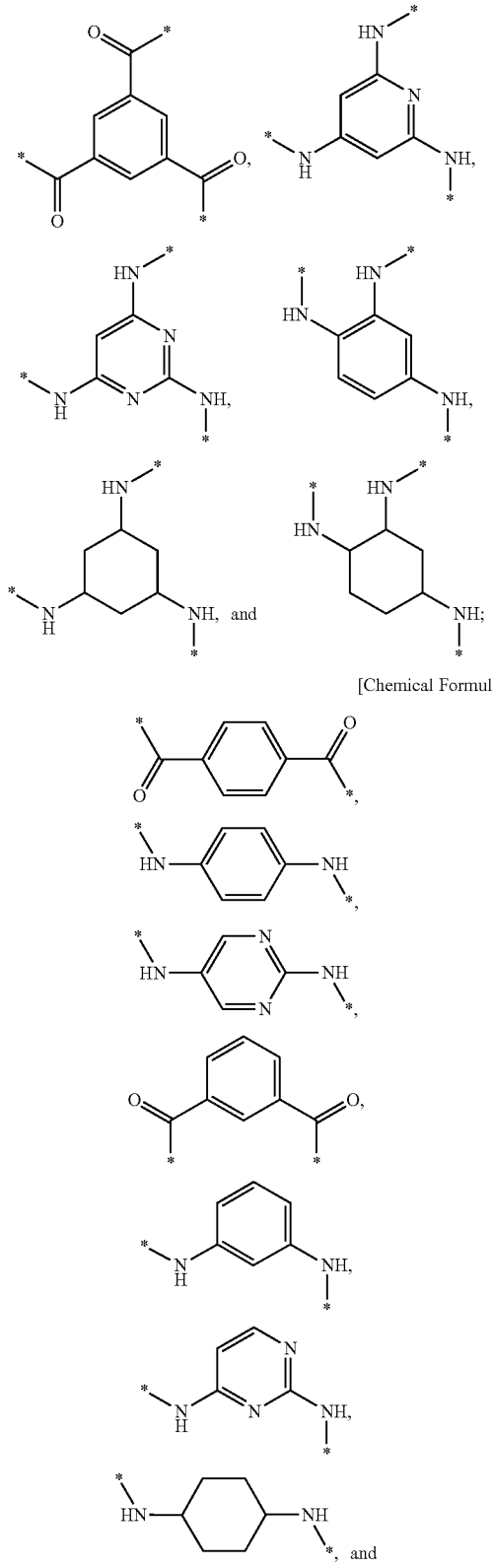

[Chemical Formula Z2]

5. The polyimide-based block copolymer of claim 1, wherein the first repeating unit comprises a repeating unit represented by Chemical Formula 1A, and the second repeating unit comprises a repeating unit represented by Chemical Formula 2A:

[Chemical Formula 1A]

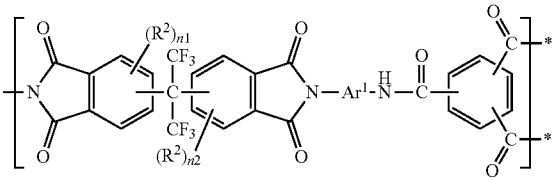

[Chemical Formula 2A]

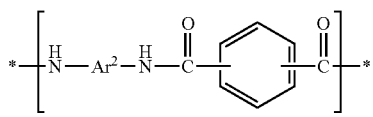

wherein, in Chemical Formulae 1A and 2A,
each $R^2$ is independently —H, —F, —Cl, —Br, —I, —CF$_3$, —CCl$_3$, —CBr$_3$, —CI$_3$, —NO$_2$, —CN, —COCH$_3$, —CO$_2$C$_2$H$_5$, a silyl group containing three C1 to C10 aliphatic organic groups, a C1 to C10 aliphatic organic group, or a C6 to C20 aromatic organic group;
n1 and n2 are independently 0 to 3; and
$Ar^1$ and $Ar^2$ are the same as or different from each other in each repeating unit, and each is independently a C6 to C30 aromatic organic group, at least one of $Ar^1$ and $Ar^2$ comprises a C6 to C30 aromatic organic group substituted with —COOH, acrylate, or methacrylate, and the aromatic organic group exists alone, or two or more aromatic organic groups are bonded to each other to form a condensed ring, or two or more aromatic organic groups are linked by a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

6. The polyimide-based block copolymer of claim 1, wherein the first repeating unit comprises a repeating unit represented by Chemical Formula 1B, and the second repeating unit comprises a repeating unit represented by Chemical Formula 2B:

[Chemical Formula 2A]

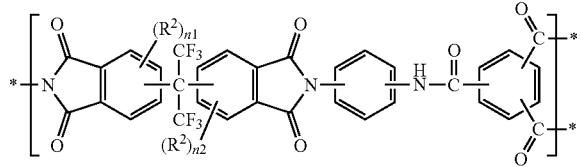

-continued

[Chemical Formula 2B]

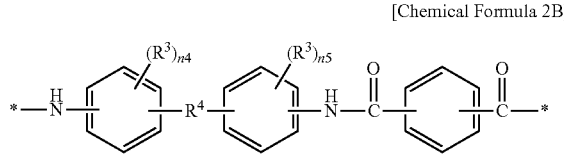

wherein, in Chemical Formulae 1B and 2B, each $R^2$ is independently —H, —F, —Cl, —Br, —I, —$CF_3$, —$CCl_3$, —$CBr_3$, —$CI_3$, —$NO_2$, —CN, —$COCH_3$, —$CO_2C_2H_5$, a silyl group containing three C1 to C10 aliphatic organic groups, a C1 to C10 aliphatic organic group, or a C6 to C20 aromatic organic group;

n1 and n2 are independently 0 to 3;

each $R^3$ is independently —COOH, acrylate, or methacrylate;

n3 to n5 are independently 0 to 4, and at least one of n3 to n5 is more than 1; and each $R^4$ is independently a single bond, —O—, —S—, —C(=O)—, —CH(OH)—, —S(=O)$_2$—, —Si(CH$_3$)$_2$—, —(CH$_2$)$_p$— (wherein 1≤p≤10), —(CF$_2$)$_q$— (wherein 1≤q≤10), —C(CH$_3$)$_2$—, —C(CF$_3$)$_2$—, or —C(=O)NH—.

7. The polyimide-based block copolymer of claim 1, wherein a weight ratio of the first repeating unit to the second repeating unit is 1:1 to 3:1.

8. The polyimide-based block copolymer of claim 1, wherein a weight average molecular weight thereof is 100,000 to 5,000,000 g/mol.

9. A polyimide-based film comprising the polyimide-based block copolymer according to claim 1.

10. The polyimide-based film of claim 9, wherein pencil hardness is at least 1H, as measured in accordance with ASTM D3363.

* * * * *